June 9, 1942.   H. O. HEM   2,285,926
WEIGHING SCALE
Filed Aug. 16, 1939   2 Sheets-Sheet 1
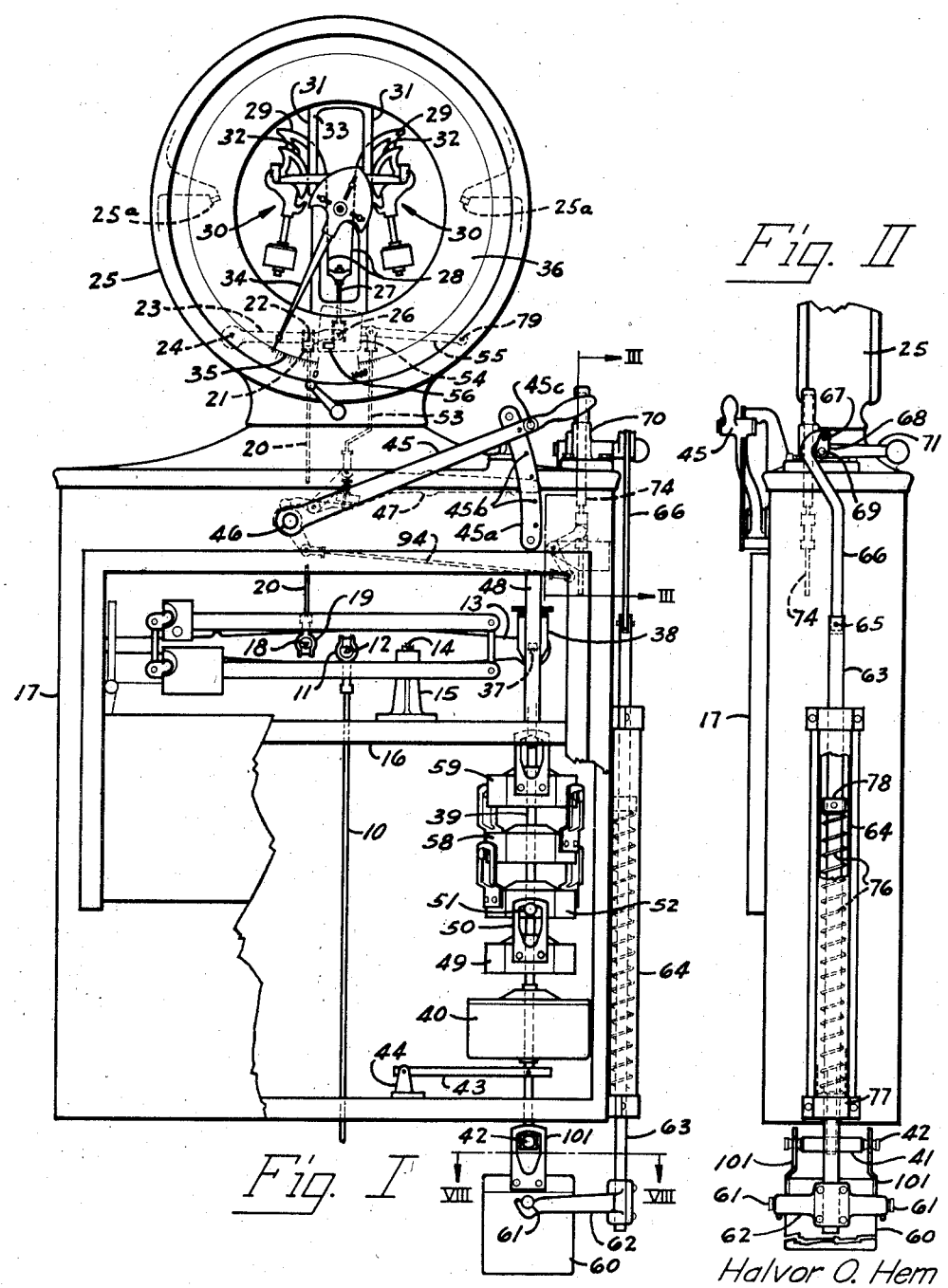
Fig. I
Fig. II
Halvor O. Hem
INVENTOR
BY Marshall & Marshall
ATTORNEYS

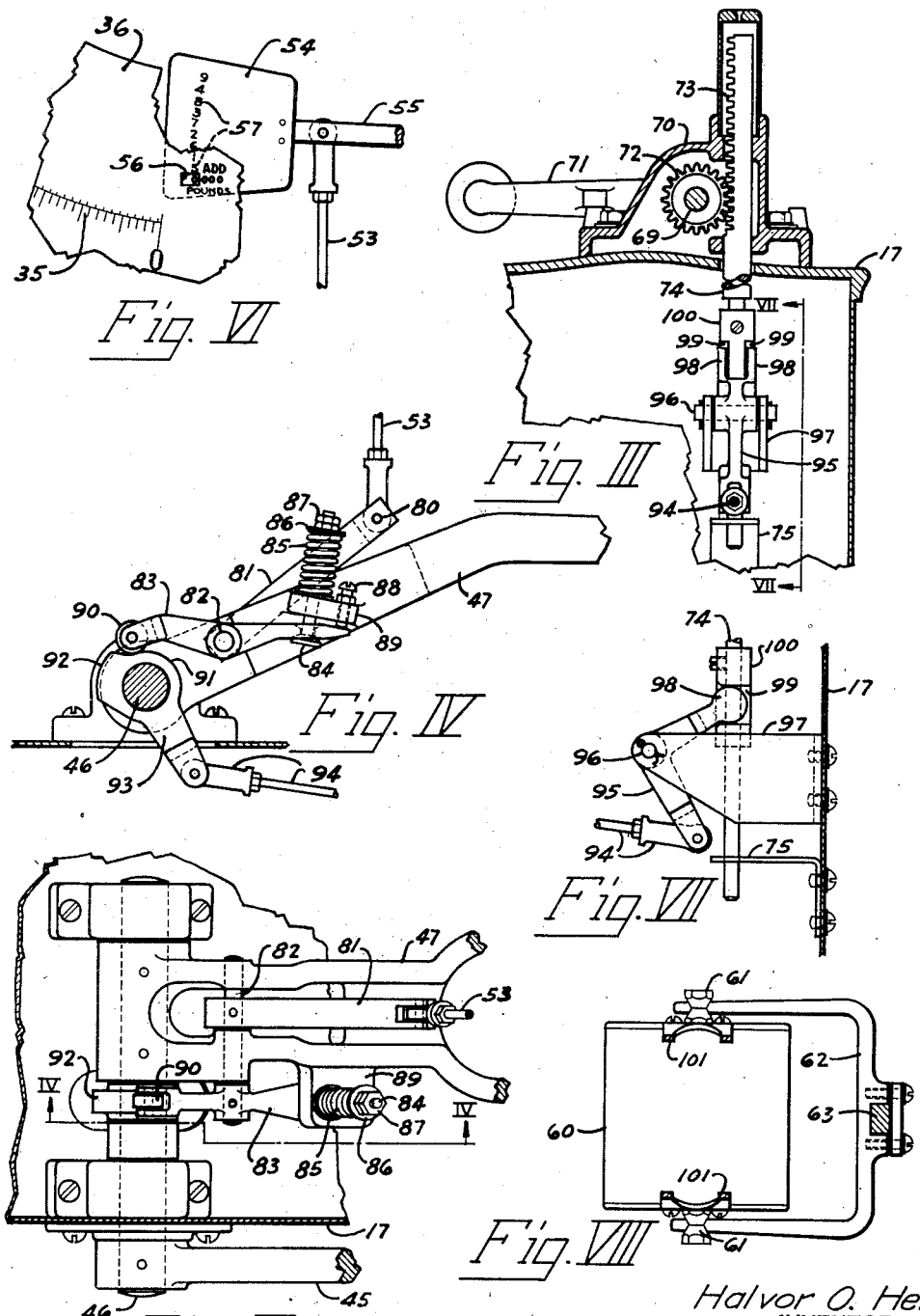

Patented June 9, 1942

2,285,926

UNITED STATES PATENT OFFICE 2,285,926

WEIGHING SCALE

Halvor O. Hem, Toledo, Ohio, assignor to Toledo Scale Company, Toledo, Ohio, a corporation of New Jersey Application August 16, 1939, Serial No. 290,512

3 Claims. (Cl. 265—48)

This invention relates generally to weighing scales, and more particularly to weighing scales adapted to weigh comparatively heavy loads by the cooperation of automatic load counterbalancing mechanism and manipulative load counterbalancing mechanism. In scales of this type the counterbalancing capacity of each of the manipulatively actuated unit weights, or counterpoises for increasing the weighing capacity, is the same as that of the automatic load counterbalancing mechanism so that the two may be jointly employed in the manner that is well known. In such scales, however, the number of capacity increasing steps that can be provided are more or less limited due to the space required by the manipulative unit weights.

The principal object of the present invention is therefore the provision of an improved unit weight mechanism which is capable of doubling the number of counterbalancing steps without doubling the space required by the unit weights or counterpoises.

Another object is the provision of an auxiliary weight, mounted exteriorly of the scale cabinet for augmenting the weighing capacity of the scale.

Another object is the provision of improved means for visually indicating each of these steps; and, Still another object is the provision of improved means for manipulating a series of unit weights.

These, and other objects and advantages will be apparent from the following description in which reference is had to the accompanying drawings, illustrating preferred embodiments of the invention and in which similar reference numerals refer to similar parts throughout the several views.

In the drawings:

Fig. I is a front elevational view of the device embodying the invention, parts being broken away.

Fig. II is an end elevation thereof.

Fig. III is an enlarged fragmentary sectional view of means for operating a manipulative counterbalancing system, viewed substantially from along the line III—III of Fig. I.

Fig. IV is an enlarged fragmentary elevational view, with parts in section, of the unit weight indicator actuating mechanism substantially as seen from along the line IV—IV of Fig. V.

Fig. V is an enlarged fragmentary plan view thereof.

Fig. VI is an enlarged fragmentary elevational view of the indicating means.

Fig. VII is an enlarged fragmentary elevational view, partly in section, of the means connecting the indicator actuating means to the secondary unit weight actuating means substantially as seen from along the line VII—VII of Fig. III.

Fig. VIII is an enlarged plan view, with parts in section, of the secondary unit weight and its actuating means as seen from along the line VIII—VIII of Fig. I.

Referring to the drawings in detail:

The load counterbalancing means illustrated in the drawings is adapted to be operatively connected to any preferred load receiving mechanism by means of a rod 10 whose upper end, provided with a stirrup 11, engages a load pivot 12 in the beam lever 13. This beam lever 13, by means of a pivot 14, is fulcrumed upon suitable bearings in the upper end of a fulcrum stand 15, arising from a horizontal shelf 16 in the cabinet 17. A power pivot 18, which is stationed in the beam 13, in spaced relation to the pivots 12 and 14, engages a stirrup 19 on the lower end of a connecting rod 20 whose upper end, by means of a stirrup 21, engages a load pivot 22 fixed in a pendulum operating lever 23. This pendulum operating lever 23 is fulcrumed at 24 in the interior of a substantially watchcase-shaped housing 25 surmounting the cabinet 17. A power pivot 26 in the pendulum operating lever 23, by means of a connection 27, engages the lower ends of flexible metallic ribbons 28 whose upper ends overlie and are fastened to arcuate faces of power sectors 29 of load counterbalancing pendulums 30 which, by means of ribbons 31 and fulcrum sectors 32, are suspended from a sector frame 33 which is suitably positioned in the interior of the housing 25.

Well known means (not shown) are provided which operatively connect the pendulums 30 to an indicator 34 cooperating with indicia 35 on a chart 36 to visually indicate weights of loads placed upon the load receiver. Any load placed on the load receiver exerts a "pull" on the connecting rod 10 which transmits this pull through the beam 13, the connections 20 and 27 to the load counterbalancing pendulums 30 which move outwardly and upwardly until their weight moments exactly counterbalance the weight of the load on the receiver. During this pendulum movement, the indicator, which is operatively connected thereto, traverses an angle that is proportional to the weight and indicates the weight of the load on the chart 36.

The mechanism thus far described is well adapted to determine weights of loads within the counterbalancing capacity of the pendulums 30, but for the purpose of counterbalancing loads in excess of the counterbalancing capacity of the pendulums the end of the beam 13 is provided with a pivot 37 from which, by means of a stirrup 38, a rod 39 is dependingly suspended. Secured to a point adjacent the lower end of this rod is a unit weight receiver 40 and the lower end of this rod 39 is studded into a cross head 41 having spool-shaped ends 42 which is provided for a purpose which will later become clear. To prevent oscillation about the pivot 37, the rod 39 with the thereto attached unit weight receiver 40 is pivotally connected to one end of a check link 43 whose other end pivotally engages a suitable stand 44 fixed to the bottom of the cabinet 17.

For the purpose of increasing the weighing capacity of the scale a handle lever 45, rockably mounted up on the shaft 46, is provided. The free end of the lever cooperates with a positioning segment 45a having a plurality of openings 45b which a latch 45c, assembled in the handle lever 45, is adapted to enter. The shaft 46, on which the handle lever 45 is keyed, projects into the interior of the cabinet 17 and on the end in the interior of this cabinet is keyed a lever 47 so that it partakes of the movement of the handle. When it is desired to increase the weighing capacity of the scale the latch 45c is disengaged from its opening 45b in the segment 45a and the handle is depressed and since, as hereinbefore stated, the lever 47 partakes of this movement, a frame 48 (Fig. I) which is pivotally suspended from the lever 47 lowers the lowermost of a series of unit weights 49, 52, 58 and 59 on the unit weight receiver 40. The extent of the downward movement of the unit weight 52 is sufficient to completely disengage a spool-like projection 51 from a suspension ear 50 of the unit weight 49 so that the unit weight 49 now rests freely on the receiver 40. The weight of this unit weight 49 is such that its moment, acting through the arm of the beam 13 from the fulcrum pivot 14 to the pivot 37, exactly counterbalances the "pull" of a load on the load receiver whose weight is equal to the counterbalancing capacity of the pendulums 30 and thus returns the indicator 34 so that it again registers with the zero indicium of the series of indicia 35 on the chart 36.

The downward movement of the arm 47 through a connecting rod 53, which is operatively connected to the lever 47, causes a flash 54 fixed to the end of a lever 55 directly in back of an opening 56 in the chart 36 to move downwardly so that an indicium "1" of a series 57 on the flash 54, appears in this opening and is visible to the operator. Immediately adjacent the opening 56 this chart bears the notation "add-000-pounds" in such a manner that the three zeros are directly in line with the opening so that when the numeral 1 appears therein the operator will read this inscription as "add-1,000-pounds" meaning, of course, the indication on the chart 36, as pointed out by the indicator 34, to give the total weight of the load on the platform. Further downward movement of the lever 45 causes the unit weight 52 to be deposited on top of the unit weight 49 thereby becoming disengaged from a unit weight 58 from which it is suspended. The counterbalancing capacity of the scale is thus increased by another increment of 1,000 pounds and the indicium "2" on the flash 54 will notify the operator that 2,000 pounds must be added to the indication of the chart. The same operation is performed in dropping the unit weight 58 and a unit weight 59, which is the last of the series in the device shown.

The construction and operation of the unit weight mechanism so far described is fully disclosed in Patent 1,423,660 to Hem and is, therefore, described herein only to an extent so as to fully disclose its relation to the present invention.

According to the present invention, means are provided so that the unit weight mechanism may be employed a second time to counterbalance additional increments of load. These means comprise a counterpoise or weight 60, substantially rectangular in shape, provided with two projections 61 which are adapted to be engaged by the diverging walls of a V notch in the arms of a fork-like holder 62 securely clamped to the lower end of a rod 63 extending upwardly through a tube-like member 64 fastened to one of the side walls of the cabinet 17. The upper end of this rod pivotally engages at 65 the lower end of member 66 whose upper bent end is pivotally connected at 67 to a short crank arm 68 integral with an operating handle 71 which is pinned to a shaft 69. This shaft 69 is turnably mounted in a bracket 70 bolted on the top of the cabinet 17. The bracket 70 has a hollow interior (Fig. III) housing a pinion 72 which is also keyed to the shaft 69 and its teeth engage teeth of a rack 73 cut into a round, rod-like member 74 whose lower portion is turned to a smaller diameter which projects through and is guided by an opening in an angle plate 75 bolted to the adjacent interior end wall of the cabinet 17.

As a means for preventing shock, and to aid in counterbalancing the weight of the counterpoise 60 when suspended from the fork 62, a helical compression spring 76 is circumjacently mounted on the rod 63, between a lower bracket 77 which also forms a guide for the rod 63, and a collar 78 locked on this rod 63.

As previously mentioned, the principal object of this invention is to increase, step by step, the weighing capacity by providing means whereby the customary unit weight system of a scale may be used more than once to offset loads. This also necessitates a change in the customary unit weight indicating means. According to the invention as may be seen in Fig. VI, there are two series of unit weight indicia on the flash 54. These are interspersed and they appear on the flash in the following order: 0—5—1—6—2—7—3—8—4—9. When in operation the movement of the flash about its fulcrum 79 in the housing 25 is such that during the first sequential application of the unit weights they will be presented in the opening 56 in numerical order, for example, 1, 2, 3 and 4, but when the unit weights 49, 52, 58 and 59 are used for the second time means are provided for shifting the initial position of the flash so that the interspersed numerals 5, 6, 7, 8, and 9 appear in their correct order in the opening 56.

To accomplish this, the lower end of the flash operating rod 53 (Figs. IV and V) is pivotally connected at 80 to a flash actuating arm 81 pinned to a shaft 82 stationed in suitable apertures in the unit weight operating lever 47. Secured to a projecting end of the shaft 82 is a lever 83. One end of the lever 83 is held, by the cooperation of a bolt-like member 84, a compression spring 85, washer 86 and nuts 87, against the end of a stop screw 88 which is threaded through a self-like boss 89 projecting outwardly from the lever 47. The screw 88 is adjusted in the boss 89 so that a roller 90, mounted in the opposite end of this lever 83, is just out of contact with a circular body portion 91 of a flash positioning cam 92, which is freely seated upon the shaft 46 immediately adjacent the fulcrum end of the lever 47, during the first sequential deposition of the unit weights 49, 52, 58, and 59 on the receiver 40.

Integral with the body and cam portions 91 and 92 respectively is an actuating arm 93 having a clevis-like end which pivotally engages one end of an adjustable connecting rod 94 whose other end pivotally engages an arm of a crank 95 (Fig. VII). The crank 95 is pivoted on a pintle 96 extending between the arms of a U-shaped bracket 97 bolted to the adjacent wall of the cabinet 17. Another arm of this crank, which extends at a substantial angle to the first mentioned arm, is bifurcated and each of the spaced arms so formed is provided with cylindrical ends 98 which are positioned in channels 99 milled in the sides of a block 100 which is securely locked on the turned-down portion of the rod-like member 74.

Assuming that a scale of the type described, capable of automatically counterbalancing and indicating loads up to 1,000 pounds, is equipped with four unit weights, each of which is adapted to counterbalance 1,000 pounds when brought in cooperative relation to the automatic load counterbalancing mechanism, and according to this invention is further provided with means enabling the previously mentioned series of unit weights to be employed a second time so that each of them may again counterbalance 1,000 pounds of load, the operation is as follows:

It is now assumed that a load greater than 5,000 pounds, for example 7,385 pounds, is on the load receiver, that the unit weights 49, 52, 58 and 59 are deposited on the receiver 40 and the pendulums 30 are in their maximum counterbalancing position and resting against stops 25a in the interior of the housing 25. The indicator 34 has passed the 1,000 pound indicium on the chart 36 and is positioned over the free space on the chart 36 between the zero and the 1,000 pound indicia, and the numeral 4 on the flash 54 appears in the opening 56, the operator then turns the handle 71 in an anticlockwise direction and the short crank arm which is integral with this handle lowers the members 66, 63 and the fork-like counterpoise holder 62, in which the counterpoise 60 is suspended by the spool-like projections 61 until the weight 60 is freely suspended, by ears 101 secured thereto, from the spool-shaped ends 42 on the cross head 41 secured to the lower end of the rod 39. The weight of the counterpoise 60 now overbalances the "pull" of the load, the pendulums 30 move downwards and the indicator 34 rotates in anticlockwise direction. Since the counterbalancing moment of the load counterbalancing means now is greater than the "pull" of the load the indicator passes the zero indicium and again comes to rest over the free space on the chart previously mentioned. The operator then, by means of the handle 45, raises the uppermost unit weight 59 of the series and observes the indicator. If this remains over the space between the zero and 1000 pound indicia on the chart it is an indication that another weight must be raised and he continues to lift the weights from the weight receiver 40 by means of the handle 45 until the indicator leaves the aforementioned space and comes to rest over an indicium in the series 35 on the chart 36. This indicium indicates the amount of the load which is being counterbalanced by the pendulums. When the operator turns the handle 71 in the counterclockwise direction the pinion 72, which is fixed on the shaft 69 on which the handle 71 is pinned, moves the rack 73 downwards and shoulders of the channel 99 cut in the block 100, pressing against the cylindrical ends 98 of the crank 95, cause this crank to rotate about its pintle 96 and the connecting rod 94, pivotally connected to this crank, forces the cam 92 to rotate until the roller 90 on the lever 83 rests on the periphery of the cam. Since the lever 83 is pinned on the shaft 82, the lever 81 partakes of its movement since it also is secured to this shaft and the movement of the end of the lever 81 is transmitted through the connection 53 to the lever 55 changing the initial position of the flash 54 so that when the counterpoise 60 is suspended from the rod 39 and the series of unit weights 49, 52, 58 and 59 are free of the receiver 40 the numeral 5 on the flash 54 now appears in the opening 56 and during the second sequential application of the unit weights the interspersed numerals 6, 7, 8 and 9 will be visible in the opening 56 when their corresponding unit weights are in counterbalancing position.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, weighing mechanism comprising automatic load counterbalancing mechanism, indicating means cooperating therewith, and manipulative load counterbalancing mechanism, said manipulative load counterbalancing mechanism comprising a series of progressively applicable unit weights and a counterpoise adapted when actuated to supplement the counterbalancing action of said series of unit weights, a second indicating means cooperating with said manipulative load counterbalancing means, said second indicating means comprising a flash, numerals of a lower order and of a higher order marked on said flash, said lower order numerals being indicative of the load counterbalancing significance of said unit weights when acting independently, and said higher order of numerals being indicative of the load counterbalancing significance of the unit weights and counterpoise when acting conjointly, each of said numerals of a higher order being positioned between numerals of the lower order, means responsive to the application of said unit weights to move said flash, and means responsive to the actuated and nonactuated condition of said counterpoise to so position said flash that movement thereof in response to the application of said unit weights will respectively display said higher order or said lower order of numerals.

2. In a weighing scale, in combination, lever mechanism, automatic load-counterbalancing and load-indicating means connected to said lever mechanism, super-capacity counterbalancing means including a series of unit weights and manipulative means for connecting said unit weights to said lever mechanism, means for indicating the super-capacity significance of said unit weights as they are connected to said lever mechanism, manipulative means for changing the effect of said super-capacity counterbalancing means and means for simultaneously and correspondingly changing the means for indicating the super-capacity significance of said unit weights to indicate their super-capacity effect plus that of the means for changing the effect of said super-capacity counterbalancing means.

3. In a weighing scale, in combination, lever mechanism, automatic load-counterbalancing and load-indicating means connected to said lever mechanism, super-capacity counterbalancing means including a series of unit weights and means for connecting said unit weights to said lever mechanism, means for indicating the super-capacity significance of each of said unit weights as it is connected to said lever mechanism, a counterpoise the mass of which is a multiple of the mass of any of said unit weights, means for connecting said counterpoise to said lever mechanism and thereby changing the super-capacity significance of said super-capacity counterbalancing means, and means automatically operated as said counterpoise is connected to said lever mechanism for changing the means for indicating the super-capacity significance of said unit weights so as to indicate the super-capacity significance of the counterpoise plus that of each of said unit weights as it is connected to said lever mechanism.

HALVOR O. HEM.